United States Patent [19]

Slaker

[11] 3,920,970
[45] Nov. 18, 1975

[54] LASER SCANNER FLAW DETECTION SYSTEM USING BASELINE FOLLOWER SIGNAL PROCESSING

[75] Inventor: Frank A. Slaker, Norwalk, Conn.

[73] Assignee: Intec Corporation, Norwalk, Conn.

[22] Filed: Apr. 30, 1974

[21] Appl. No.: 465,510

[52] U.S. Cl. ............ 235/151.3; 250/552; 250/563; 250/572; 356/200; 356/237
[51] Int. Cl.² ........................................ G01N 21/32
[58] Field of Search............ 235/151.3, 151.35, 183; 340/347 CC; 356/199, 200, 237, 238, 239; 250/571, 572, 552, 559, 562, 563; 73/23.1; 328/162

[56] References Cited
UNITED STATES PATENTS

| | | | |
|---|---|---|---|
| 3,026,415 | 3/1962 | Lake, Jr. et al............. | 356/200 U X |
| 3,475,600 | 10/1969 | Spence......................... | 340/347 CC |
| 3,628,003 | 12/1971 | Spence........................ | 235/151.35 X |
| 3,652,863 | 3/1972 | Gaskell.......................... | 250/571 X |

Primary Examiner—Joseph F. Ruggiero
Attorney, Agent, or Firm—Joseph Levinson, Esq.

[57] ABSTRACT

The output of the detector of a laser scanner flaw detection system is processed to treat changes therein which are not related to the detection of flaws. Detector output is applied to a baseline extractor providing a moving average baseline signal which is fed with the detector output in one mode to a differential circuit producing a difference signal which is applied to a discriminator. In an alternative mode, the detector output is applied directly to the discriminator. The baseline extractor is coupled to a threshold circuit which is coupled to the discriminator. Signals from the differential circuit or from the detector are passed by the discriminator if they exceed a predetermined threshold to provide a flaw output. A clamp circuit is also provided for removing ambient light on the detector from the detector output signal.

13 Claims, 4 Drawing Figures

LASER SCANNER FLAW DETECTION SYSTEM USING BASELINE FOLLOWER SIGNAL PROCESSING

BACKGROUND OF THE INVENTION

This invention relates to a laser scanner flaw detection system, and more particularly to such a system which utilizes the output signal from the system detector for compensating for various system errors and anomalies in the flaw detection process.

In U.S. Pat. No. 3,781,531, entitled "Flaw Detection System Utilizing a Laser Scanner," granted Dec. 25, 1973, which is assigned to the assignee of the present invention, a laser scanner flaw detection system is described for detecting flaws in the surfaces of material, by repetitively scanning a laser beam across the surface of the material being examined. The laser light is reflected, transmitted, or scattered from the material, depending upon the characteristics of the material, with such light being received by a photomultiplier detector. At any instant of time during the scan the photomultiplier output varies with the reflectivity, transmissivity, or scattering properties of the spot upon which the laser beam is impinging, and deviations from normal variations provide a means for indicating material flaws. As was pointed out in the aforesaid patent, when scanning across homogeneous, flaw-free surfaces, a certain quantity of light is seen by the photomultiplier tube which produces a light level or signal referred to as the "baseline signal." This light level will increase or decrease from the baseline level as the result of a flaw occurring on the surface of the material being scanned, and provides the means for detecting such flaws. However, even in the absence of flaws, the baseline level does not remain constant, and varies as a function of the impingement angle of the laser beam on the material being scanned, as well as the relative angles and distances between the laser beam and the PMT. The type of surface being examined, changes in ambient light, and also changes in the optical and electrical characteristics of the system, result in baseline signal changes. Accordingly, in order to be able to detect flaws as distinguished from system anomalies, the effects of changes in baseline signal not produced by flaws occurring on the surface of the material being examined must be treated or compensated for in order to be able to detect actual flaws. The aforesaid patent treats this problem by normalizing the baseline signal such that flaws occurring at any point in the active scan region have the same amplitude, and by using fixed thresholding, flaws which exceed the threshold are applied to a discriminator for providing a flaw output. The aforesaid system works quite well for many applications, but in those applications where there are large variations in the baseline signal, the baseline signal may be difficult to normalize. An example of such an application would be that of a material having a glossy type finish, such as certain types of paper, and other materials. The system also involved fixed threshold levels which were compared to the normalized signal for detecting flaws above the threshold level. If any errors occurred in the normalized signal, the fixed threshold might pass a flaw where none exists, or reject a flaw which did exist.

Another source of error present in laser scanner systems comes from ambient lighting conditions. The amount of light falling on the PMT is a combination of the laser light which is transmitted, reflected, or scattered from the material, plus any ambient light which also illuminates the material. Elaborate hood-type structures have been provided for restricting the amount of ambient light which is applied to the surface of the material being examined. Even so, there is some ambient light which impinges upon the material, which produces an error in signal output.

Accordingly, it is an object of this invention to provide a new and improved laser scanner flaw detection system which may examine material for flaws which have been difficult to detect using prior systems.

A further object of this invention is to provide a new and improved laser scanning processing which combines several processing functions and is applicable to the examination of materials which have previously been difficult to examine.

Another object of this invention is to provide a laser scanning system which continually compensates the output thereof for ambient lighting conditions.

Still another object of this invention is to provide a new and improved flaw detection system which automatically compensates for system errors and/or system sensitivity variations, thereby providing a greater flexibility and capability of detecting flaws on different types of material.

SUMMARY OF THE INVENTION

In carrying out this invention in one illustrative embodiment thereof, a laser beam is successively scanned across the surface of material being examined, and a detector is positioned for receiving radiation from the material for producing a signal in response to the intensity of the radiation received. The signal from the detector is applied to a baseline extractor whose output provides a moving average baseline signal which is fed along with the detector signal in one mode to a differential circuit to provide a difference signal which is applied to a discriminator. In the alternative mode, the detector signal is applied directly to the discriminator. The baseline signal from the baseline extractor is also connected to a threshold circuit whose output varies in accordance with the baseline signal. The output of the threshold is applied to the discriminator and signals from the differential circuit or from the detector, depending on the mode employed, are passed by the discriminator if they exceed the predetermined threshold to provide a flaw output. A clamp circuit is also provided for removing the ambient light on the detector from the detector output signal.

BRIEF DESCRIPTION OF THE DRAWINGS

FIGS. 3 and 4 are plots of detector signal versus time which will be useful in the description of the circuits shown in FIG. 2.

DESCRIPTION OF THE PREFERRED EMBODIMENT

Figure 1:
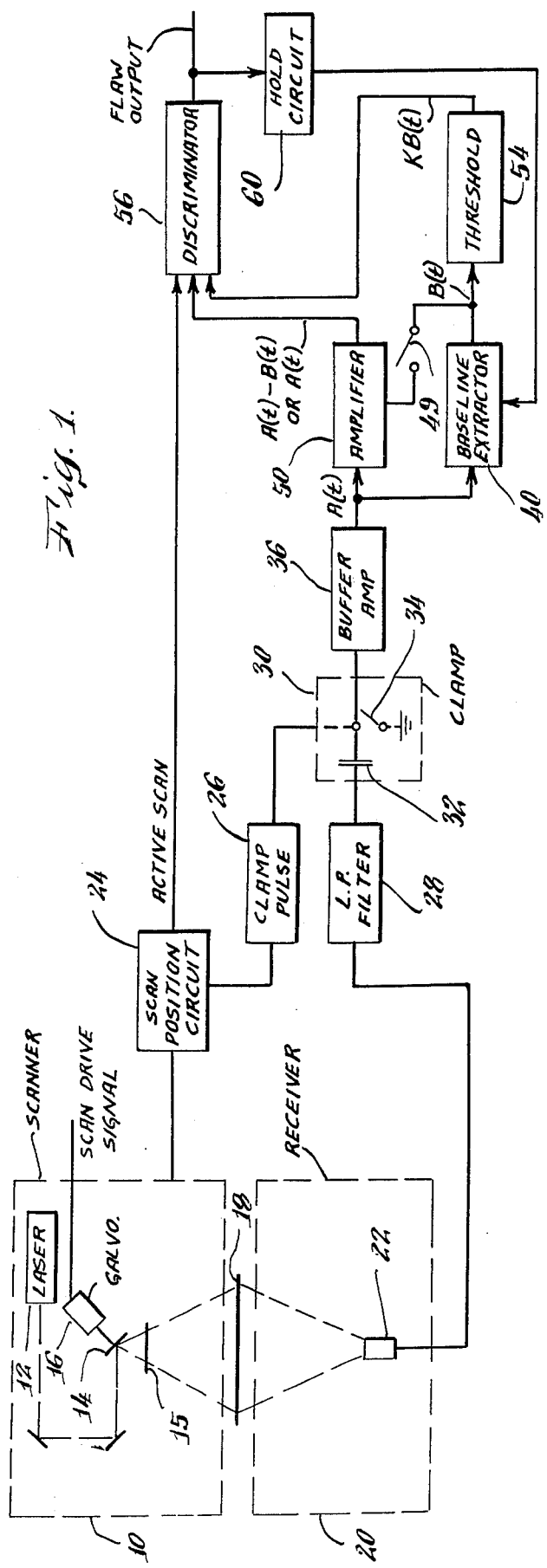
FIG. 1 is a block diagram of an illustrative embodiment of the present invention.

Referring now to FIG. 1, a scanner 10 includes a conventional laser 12 such as a helium neon or argon ion gas laser or other suitable type which is capable of generating a laser beam of monochromatic light in a predetermined spot size. The laser beam is scanned by a galvanometer mirror 14, or any other suitable scanning device, successively across a web of material 18 which is continuously moving in a direction perpendicular to the plane of the paper. Scanning is achieved by driving a galvanometer 16 which drives in pivotal fashion the galvanometer mirror 14 which deflects the laser beam from the laser 12 and causes it to scan back and forth across the surface of the material 18. Scanning in the orthogonal direction to create a raster is accomplished automatically by the movement of the web of material 18. Light passes through the material 18 to a receiver 20 having a detector in the form of a photomultiplier tube 22. At any instant of time during the scan the photomultiplier tube 22 provides an output which is proportional to the transmissivity or reflectivity of the spot upon which the laser beam is impinging. Flaws occurring on the surface of the material 20 being examined change the output of the photomultiplier tube 22 due to the transmissive or reflective properties of the material being examined, providing a means for indicating flaws on the surface. One form of scanner 10 and receiver 20 is shown and described in an application entitled "Laser Scanner Flaw Detection System," Ser. No. 449,247, filed Mar. 8, 1974, which is assigned to the assignee of the present invention. Although a transmissive system is illustrated for purposes of disclosure, a reflective type system where the output of the photomultiplier tube 22 is proportional to the reflectivity or refractivity of the spot upon which the laser beam is impinging is also applicable to the present invention. Whether a transmissive or a reflective mode is utilized depends upon the application and the material being examined.

The scanner 10 may be provided with a mask 15 having an opening therein defining the extent of the angle of scan of the laser beam, and accordingly the width dimension of the line scanned on the material 18. When the laser beam reaches the end of scan on a given line, it will be blocked by the mask 15 with the material 18 then illuminated only by ambient light conditions. Alternative means for masking may be provided, e.g. by masks applied to the receiver or opaque rollers on which the web moves. The scanner 10 is also provided with scan position circuitry 24 for defining the active scan interval which is fed to the discriminator circuitry so that flaws are indicated only during the active scan intervals. The scan position circuitry disclosed in the aforesaid application may be utilized, but the invention is not restricted to this type of scan, whether it be sinusoidal or linear, and is not restricted to the type of scan position circuitry for determining the period of active scan.

The light picked up by the PMT 22 generates a composite signal, later referred to hereinafter as A(t). The PMT signal is applied to a low-pass filter 28 which functions to maximize the signal-to-noise ratio of the PMT output. A plurality of filters may be utilized using suitable switch means, and the filter will be selected to provide the necessary bandpass and the best signal-to-noise ratio. The output of the filter 28 is then applied to a clamp circuit 30. The clamp circuit 30 includes a capacitor 32 and a switch 34, preferably in the form of a field effects transistor which is actuated by a clamp pulse 26 which may be derived from the scan position circuit 24. The clamp pulse 26 will be generated at the end of a scan line when no laser illumination is left on the material 18, by the mask 15 or any other suitable means. Since under these conditions only ambient light remains on the photomultiplier tube 22, the PMT output signal carrying only ambient light is clamped to 0 volts by the switch 34, which in effect eliminates the effect of ambient lighting by subtracting it from the PMT signal during active scan. Since the clamp is activated on each line, there is an automatic up-dating at the scan rate which will handle changes in ambient light conditions for each scan line. Merely as an example, the clamp 30 may utilize a National AH0019 analog switch. The output of the clamp 30 is applied via a buffer amplifier 36 to a differential circuit 50 and a baseline extraction circuit 40. This clamped signal A(t) is a composite signal including the baseline signal, noise, and any flaw pulses which have been detected by the PMT, with, of course, the absence of the effects of ambient light which have been removed by the clamp 30.

As was pointed out hereinbefore, when scanning across homogeneous flaw-free surfaces, a certain quantity of reflected or transmitted light is seen by the photomultiplier tube which produces a light level and signal referred to as the baseline signal. This signal includes any anomalies produced by the scanning, such as amplitude variations across the scan, and varies with the type of surface being examined as well as changes in the optical and electrical characteristics of the system. This changing of the baseline signal when no flaws appear on the surface of the material being examined increases the difficulty in flaw detection, when fixed threshold functions are used, with some flaws being missed while others are detected where none exist. Since each laser scanner system produces a "signature" or baseline signal depending upon the type of scan and the type of material scanned, the present invention extracts this signal and utilizes it in the signal processing circuitry to eliminate errors caused by the very baseline signal which is being utilized.

Figure 2:
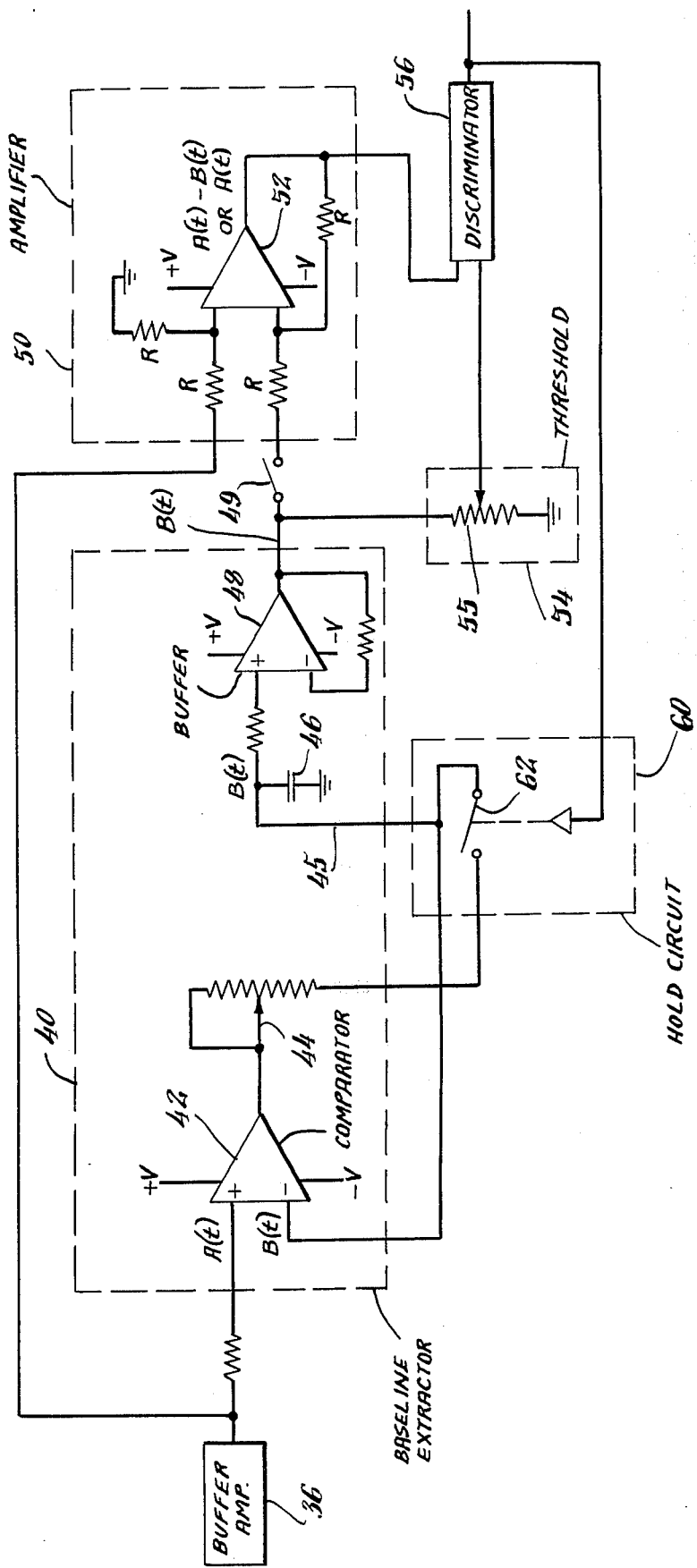
FIG. 2 is a simplified schematic diagram of the type of circuitry which may be utilized in portions of the block diagram shown in FIG. 1.

Referring now to FIG. 2, the A(t) output signal from the buffer amplifier 36 is applied to the + terminal of a comparator 42 in the extractor circuit 40. The output of the comparator 42 is applied via a variable resistor 44 through a switch 62 whose function will be described hereinafter to a capacitor 46. A feedback path 45 is coupled from the capacitor 46 back to the negative input terminal of the comparator 42. The output of the comparator 44 is a digitized form of the analog input signal which is then compared with the input after passing the RC circuit set up by resistor 44 and capacitor 46, via the feedback path 45. The voltage across capacitor 46 designated B(t) will track the moving average of A(t) by alternately switching between a plus or minus signal value created by the analog-to-digital conversion by the comparator 42. Since B(t) appearing on capacitor 46 appears differentially with respect to A(t), it has the effect of passing A(t) through a high-pass filter whose cutoff frequency is controllable by the variable resistor 44. Variable resistor 44 in fact adjusts the slew rate of the circuit, which is at the speed at which it can accommodate changes in the baseline function. The resultant B(t) signal appearing on capacitor 46, which is the moving average of the baseline signal, is applied via a buffer amplifier 48 to an amplifier circuit 50. The buffer amplifier 48 functions to prevent the loading of the RC time constant of resistor 44 and capacitor 46. The comparator 42, by way of example, can be a 311N and the buffer amplifier 48 a 747.

The amplifier circuit 50 includes an operational amplifier 52 which has applied to one input terminal thereof the A(t) signal and to the other input terminal the B(t) signal, which in one mode of operation are differenced to produce an output A(t) − B(t), which is then applied to a discriminator 56. The operational amplifier 52 may utilize a 1322 integrated circuit. The amplifier circuit 50 thus functions to provide the difference between the clamped signal from the PMT and the extracted baseline signal, the output being free of baseline and ambient effects. The alternative mode of operation removes B(t) from the amplifier 50. The amplifier output is therefore just A(t).

The extracted baseline signal B(t) is also applied to a threshold circuit 54 having a variable resistor 55 therein. The variable resistor 55 performs a scaling function. By appropriately setting the scaling function to less than 1, positive going flaw signals are detected. By multiplying the scaling function by −1, negative going flaws are detected.

A switch 49 changes the condition of amplifier 52 from a differential amplifier to a unity gain amplifier whose output is simply A(t). The signal B(t), which is the moving baseline average, may be scaled by a factor greater than 1 for positive going signal thresholding, and by a factor less than 1 for negative thresholding. Since B(t) is already a description of the receiver efficiency versus scan angle, its scaling by a factor K to form KB(t) maintains its normalizing relationship to A(t) when used to amplitude discriminate the function A(t). To illustrate, reference should be made to FIG. 3, which shows the A(t) signal and the B(t) moving baseline signal which is extracted by the baseline extractor 40. Illustrating the aforesaid scaling with numbers, let the end of scan average amplitude be equal to 1, and the center of scan average amplitude be equal to 2, as shown on FIG. 3. A flaw occurring at the edge of the scan has an amplitude of 1 which, added to the average of 1, results in a peak of 2. The identical flaw at the center would have an amplitude of 2 which, added to 2, produces a 4-unit peak. Now, if the moving average is scaled by K = 1.5, the threshold would be 1.5 at the ends and 3 at the center. In both cases, the discrimination would occur at the 50% points of the flaw signal. The KB(t) threshold level is illustrated by the dotted line on FIG. 3. It can therefore be said that the normalizing has been accomplished by scaling the threshold instead of the signal. It does not matter whether the scaling factor K is greater or less than 1. In effect, then, what is accomplished is a moving threshold which is undulated by the average baseline signal such that flaws of the same amplitude are thresholded at the same level regardless of where they appear on the baseline during a given scan interval. The KB(t) output of the threshold 54 is applied to the input of the discriminator 56 along with the difference signal A(t) − B(t), as well as active scan position information, and when the difference signal exceeds the threshold during a scan interval, a flaw output occurs at the output of discriminator 56. The discriminator 56 may be an LM311 type IC circuit.

The presence of very wide flaws occurring on the surface of the material being examined, will greatly distort and eliminate the effectiveness of the B(t) moving average baseline signal. To deal with this problem, a hold circuit 60 is coupled between the output of the discriminator 56 and the baseline extractor 40. As is shown in FIG. 2, the hold circuit 60 consists of an analog switch which, when operated in the presence of a wide flaw appearing at the output of the discriminator 56, opens the switch 62 and the B(t) signal is then taken from the charge built on capacitor 46, which consists of the baseline level just prior to the occurrence of the flaw. FIG. 4 illustrates the problem. The occurrence of a wide flaw illustrated on FIG. 4 would cause the B(t) signal to move as shown in an attempt to follow the apparent moving baseline average. The apparent average, however, is a fiction, and the proper slope would be one which follows the trend just prior to the flaw. The normal B(t) in the presence of the wide flaw would dip precipitously and then begin to rise as the wide flaw disappears. This action, if uncorrected, would seriously hamper the discriminator process. The proper slope of the baseline signal would be one which follows the trend just prior to the occurrence of the wide flaw. In the absence of this effect, the best compromise would be to hold the level of the baseline signal just prior to the flaw. This is readily accomplished by placing the switch 62 as shown in FIG. 2 at the output of the extractor 40 which is operated with the generation of an output of the discriminator 56. The result of the operation of this switch shows the corrected B(t) in dotted line form on FIG. 4. The analog switch 60 may be of any suitable type, such as an AH0015CD.

It should be noted that the system utilizes an all DC coupled signal which may be averaged around 0 volts, which provides a useful means in processing and detecting flaw signals. The type of processing used also derives the threshold for the discriminator from the signal itself, which follows the broad anomalies of the system. Any type of scan of material scanned provides a given noise signature and signal fluctuation, and since this system provides discrimination which operates on the signal itself, the detection capability is enhanced. For example, the system is not restricted by fixed parameters, such as fixed DC threshold levels. Furthermore, since the collection system efficiency is in the signal, the threshold effectively eliminates problems in this area. In using the signal itself for thresholding, the circuitry is also simplified, and has greater capability for detecting flaws on materials which would otherwise be difficult to detect using prior detection systems.

Since other changes and modifications, varied to fit particular operating requirements and environments, will be apparent to those skilled in the art, this invention is not considered limited to the examples chosen for purposes of disclosure, and covers all changes and modifications which do not constitute departures from the true spirit and scope of this invention.

I claim:

1. A flaw detection system for detecting flaws on a surface of material comprising
   a. a laser for emitting a laser beam of radiation,
   b. means for successively scanning said laser beam across a surface of material being examined,
   c. detector means receiving radiation from said material producing a detector signal in response to the intensity of the radiation applied thereto,
   d. baseline extractor means having said detector signal applied thereto for providing a baseline signal therefrom,
   e. differential circuit means having said detector signal and said baseline signal applied thereto for producing a difference signal between said detector signal and said baseline signal, f. threshold means for providing a threshold signal, and g. discriminator means having said difference signal and said threshold signal applied thereto for producing a flaw output signal when said difference signal exceeds said threshold signal.

2. The structure set forth in claim 1 wherein said baseline signal is applied to said threshold means for scaling said threshold signal in accordance with said baseline signal.

3. The structure set forth in claim 2 including a hold circuit coupled between the output of said discriminator means and said baseline extractor means for maintaining the level of said baseline signal during the occurrence of a flaw output signal from said discriminator means.

4. The structure set forth in claim 1 including a clamping means having said detector signal applied thereto, blanking means for preventing said laser beam from appearing on said material during an inactive scanning interval, and means for activating said clamping means during the blanking interval of said blanking means for clamping said detector signal to a predetermined level to compensate said detector signal for the effects of ambient lighting conditions.

5. The structure set forth in claim 1 wherein said baseline extractor means comprises a comparator having said detector signal applied to one input terminal thereon, and a variable resistor and a capacitor forming an RC circuit coupled to the output of said comparator, the feedback path from said RC circuit coupled to another input terminal of said comparator for providing said baseline signal which is the moving average of said detector signal.

6. The structure set forth in claim 3 wherein said hold circuit comprises an analog switch.

7. The structure set forth in claim 5 including a hold circuit comprising an analog switch coupled between the output of said discriminator and said RC circuit which is activated by a flaw output signal from said discriminator for maintaining the level of said baseline signal on said capacitor during the occurrence of a flaw output signal.

8. A flaw detection system for detecting flaws on a surface of material, comprising a. a laser for emitting a laser beam of radiation, b. means for successively scanning said laser beam across a surface of material being examined, c. detector means receiving radiation from said material producing a detector signal in response to the intensity of the radiation applied thereto, d. means for preventing said laser beam from appearing on said material during a non-active scanning interval, e. means for providing a clamping pulse during a portion of said non-active scanning interval, f. clamping means having said detector signal applied thereto, g. means for coupling said clamping pulse to said clamping means for clamping said detector signal at a predetermined level thereby removing from said detector signal the effects of ambient radiation on said detector signal, h. discriminator means, i. threshold means for providing a threshold level signal, and j. means for coupling said threshold level signal and said clamped detector signal to said discriminator for providing flaw output signal indicative of a flaw on the surface of the material being examined when said clamped detector signal exceeds said threshold level signal.

9. A flaw detection system for detecting flaws on a surface of material comprising a. a laser for emitting a laser beam of radiation, b. means for successively scanning said laser beam across a surface of material being examined, c. detector means receiving radiation from said material producing a detector signal in response to the intensity of the radiation applied thereto, d. baseline extractor means having said detector signal applied thereto for providing a baseline signal therefrom, e. threshold means having said baseline signal applied thereto for providing a threshold signal which is scaled in accordance with said baseline signal, and f. discriminator means having said detector signal and said threshold signal applied thereto for producing a flaw output signal when said detector signal exceeds said threshold signal.

10. The structure set forth in claim 9 including a hold circuit coupled between the output of said discriminator means and said baseline extractor means for maintaining the level of said baseline signal during the occurrence of a flaw output signal from said discriminator means.

11. The structure set forth in claim 9 including a clamping means having said detector signal applied thereto, blanking means for preventing said laser beam from appearing on said material during an inactive scanning interval, a means for activating said clamping means during the blanking interval of said blanking means for clamping said detector signal to a predetermined level to compensate said detector signal for the effects of ambient lighting conditions.

12. The structure set forth in claim 9 wherein said baseline extractor means comprises a comparator having said detector signal applied to one input terminal thereon, and a variable resistor and a capacitor forming an RC circuit coupled to the output of said comparator, the feedback path from said RC circuit coupled to another input terminal of said comparator for providing said baseline signal which is the moving average of said detector signal.

13. The structure set forth in claim 9 including a hold circuit comprising an analog switch coupled between the output of said discriminator and said RC circuit is activated by a flaw output signal from said discriminator for maintaining the level of said baseline signal on said capacitor during the occurrence of a flaw output signal.

* * * * *